(12) United States Patent
Chung

(10) Patent No.: US 9,075,201 B2
(45) Date of Patent: Jul. 7, 2015

(54) POLARIZATION CONVERSION MECHANISM AND METHOD THEREOF

(71) Applicant: TERA XTAL TECHNOLOGY CORPORATION, Hsinchu (TW)

(72) Inventor: Jun-Wen Chung, Hsinchu (TW)

(73) Assignee: TERA XTAL TECHNOLOGY CORPORATION, Hsinchu (TW)

( * ) Notice: Subject to any disclaimer, the term of this patent is extended or adjusted under 35 U.S.C. 154(b) by 217 days.

(21) Appl. No.: 13/834,630

(22) Filed: Mar. 15, 2013

(65) Prior Publication Data

US 2014/0098420 A1 Apr. 10, 2014

(30) Foreign Application Priority Data

Oct. 4, 2012 (TW) .............................. 101219236 U
Jan. 30, 2013 (TW) .............................. 102103555 A

(51) Int. Cl.
*G02B 5/30* (2006.01)
*G02B 27/28* (2006.01)
*G06F 3/041* (2006.01)

(52) U.S. Cl.
CPC ............ *G02B 5/3083* (2013.01); *G02B 27/286* (2013.01); *G06F 3/0412* (2013.01)

(58) Field of Classification Search
CPC ...... G02B 5/3083; G02B 5/32; G02B 27/286; G06F 3/0412
USPC ........................................ 359/489.07; 445/24
See application file for complete search history.

(56) References Cited

U.S. PATENT DOCUMENTS

| 5,196,953 | A  | * | 3/1993  | Yeh et al. ...................... 349/119 |
| 7,417,617 | B2 | * | 8/2008  | Eichenlaub .................... 345/102 |
| 2002/0027719 | A1 | * | 3/2002 | Kreuzer ......................... 359/631 |
| 2004/0196253 | A1 | * | 10/2004 | Eichenlaub ................... 345/102 |
| 2009/0002579 | A1 | * | 1/2009 | Tan ................................... 349/9 |
| 2009/0179143 | A1 | * | 7/2009 | Murooka et al. .............. 250/225 |

* cited by examiner

*Primary Examiner* — Frank Font
(74) *Attorney, Agent, or Firm* — Lin & Associates IP, Inc.

(57) ABSTRACT

A polarization conversion mechanism for a touch screen display includes a crystal layer and a polarizing layer. The crystal layer includes a birefringent crystal for changing phase delay effect in accordance with the orientation of the crystal axis thereof. The polarizing layer includes at least one linear polarizer such that an incident light after hitting a display module of the display device reflects and emits out through the linear polarizer and the crystal layer sequentially as reflection light in form of circularly polarized light or elliptically polarized light. The assembly of the crystal layer and the layer are installed to the display device and/or touch screen display in such a manner that the assembly is located on the display module thereof.

11 Claims, 14 Drawing Sheets

POLARIZATION CONVERSION MECHANISM AND METHOD THEREOF

CROSS-REFERENCES TO RELATED APPLICATIONS

This application claims the priorities of Taiwanese patent application No. 101219236, filed on Oct. 4, 2012 and Taiwanese patent application No. 102103555, filed on Jan. 30, 2013, which are incorporated herewith by reference.

BACKGROUND OF THE INVENTION

1. Field of the Invention

The present invention relates to a polarization conversion mechanism, more particularly to a polarization conversion mechanism and method for use in a display device and/or touch screen display.

2. Description of the Prior Art

A touch screen of a display device or mobile device is generally coated with a linear polarizer or a circular polarizer (linear polarizing layer+a quarter-wave plate) in order to be viewable under the strong environment light and to reduce the interference of the reflection light reflecting therefrom. At present one way of implementing is providing a quarter-wave plate and/or a linear polarizing layer adhesively on an external surface of the touch screen.

According to polarization theory, when a light beam passes through a wave phase delay plate, the phase difference ($\delta$) is calculated from the formula $$\frac{2\pi}{\lambda}nd,$$

wherein n denotes the refraction index of the phase delay plate; d denotes the thickness of the phase delay plate; $\lambda$ denotes wavelength of the passing light beam. When $\delta=\pi$, the passing light beam is said to be linearly polarized light; when $$\delta = \frac{\pi}{2},$$

the light is circularly polarized light and the remaining is called the elliptically polarized light. When $$nd = \frac{1}{4}\lambda$$

is an odd number, the phase difference ($\delta$) is said to be conformed to $$\delta = \frac{\pi}{2},$$

where the phase delay plate is called the quarter-wave plate. Under this condition, the linearly polarized light passing through the quarter-wave plate converts into the circularly polarized light. In the formula $\Delta n = n_e - n_o$ of the crystal layer, in case n is replaced by $\Delta n$ and when $$\Delta nd = \frac{1}{4}\lambda,$$

the phase delay plate is the quarter-wave plate, where $n_e$ and $n_o$ are commonly used to denote optical index and refractive index respectively in the art. From above explanation, it is noted that the visible light (the natural light) consists of wavelength ($\lambda$) with 400 nm to 700 nm passing through the quarter-wave plate, wherein when a single wavelength is conformed with the condition $$\left(\delta = \frac{\pi}{2}\right),$$

the visible light converts into circularly polarized light, the remaining wavelengths are substantially equivalent to the circularly polarized light or the elliptically polarized light. Moreover, when the elliptically polarized light passes through the linear polarizer, the light passage rate varies owing to the changed polarization angle of the elliptically polarized light with respect to the linear polarizer.

Due to the advance in optic technology, modern sunglasses of today are provided with a linear polarizer in order to withstand or reduce the glare of a sunny day outdoor. When the polarization direction (emitted light direction) of the linear polarizer in the sunglasses of a wearer is perpendicular to the polarization direction of a display device, the wearer cannot see the image displayed over the screen. When there is an angle formed between the two polarizations, a portion of the incident light cannot pass through the linear polarizer, thereby reducing the visibility of the image displayed over the screen. In order to overcome this disadvantage, the wave phase delay plate has been developed and is disposed over the linear polarizer so as to retard and hence prolonging the light passage through the display screen, and emitting the reflective light in form of circularly polarized light and elliptically polarized light. Since the circularly polarized light and elliptically polarized light have a relatively large passage rate relative to the linear polarizer, the problem of being unable to view the image displayed over the screen encountered in the prior art can be avoided.

In other words, the technique of absorbing the incident light is replaced by installing the linear polarizer or circular polarizer in the sunglasses so that the wearer of the sunglasses can see the image displayed over the screen of the display device. However, utilizing a polarizer (a linear polarizer+a quarter-wave plate or a quarter-wave plate+a linear polarizer) in the touch screen reduces the reflection of the incident light and the reflective light emitted from the touch screen is in form of the linearly polarized light and circularly polarized light. Under this condition, the overall thickness of the display device or mobile device is increased in addition to the expense of the polarizer.

Another way of utilizing a linear polarizer is installing the same in medium size touch display together with a wave phase delay plate so that the reflection of the incident light passes sequentially through the linear polarizer and the wave phase delay plate in term of circularly polarized light and elliptically polarized light. Since the reflection direction of the two polarized light is opposite to the hitting direction of the incident light owing to the colliding interface within the touch display and the rotational direction of the reflection, the reflection light refracts with respect to the linear polarizer after passing through the wave phase delay plate. In case the polarization direction is perpendicular with the linear polarizer, the polarized light cannot pass through the linear polarizer, thereby reducing the amount of the reflection light and hence interference between the incident and reflection light. In other words, viewing ability of the touch display under the strong environment light is increased.

Presently, a linear polarizer is usually installed on an exterior of a touch screen of a touch display together with a wave phase delay plate in order to convert the incident light as the circularly polarized light. Alternately, two wave phase delay plates are installed on the exterior and interior of the linear polarizer so as to convert the reflection light in form of circularly polarized light so as to reduce the reflection interference with the touch screen. However, the more the linear polarizer and the wave phase delay plate, the more the thickness of the touch screen becomes, thereby incurring extra expense and simultaneously reducing the utility rate of the light beam.

Therefore, it is an urgent business for the manufacturers to find or develop a polarization conversion mechanism for use in a display device and/or touch screen display, where the polarization conversion mechanism can increase the phase delay effect with the use of wave phase delay characteristics, in which a quarter-wave plate or film can be eliminated so that the linearly polarized light emits out as circularly and elliptically polarized light. The polarized plate provided accordingly has simple structure and reduces the overall thickness of the touch screen display.

SUMMARY OF THE INVENTION

The main objective of the present invention is to provide a method and polarization conversion mechanism for implementing in a display device and/or touch screen display, in which, the crystal layer applies a birefringent crystal for changing phase delay effect in accordance with the orientation of the crystal axis thereof. The crystal layer possesses the wave phase delay characteristics; it can replace a wave phase delay plate and converts the reflective light in form of circularly polarized light and elliptically polarized light. By controlling the orientation of the crystal axis of the crystal constituting the crystal layer, the crystal layer can serve as a transparent window, which does not affect the reflective light regardless of position of the display device and/or touch screen display.

Another objective of the present invention is to provide a polarization conversion mechanism for implementing in a display device and/or touch screen display, in which a quarter-wave plate is excluded and in which the crystal layer adapts to convert and emit out the incident light in form of circularly polarized light and/or elliptically polarized light, thereby reducing the overall thickness of the display device. Since polarizer employed has simple structure, the manufacturing cost thereof can be reduced.

The display device and/or touch screen display is preferably selected from a group consisting of Out-Cell LCD touch display, In-Cell LCD touch display, On-Cell LCD touch display, In-Cell/On-Cell hybrid LCD touch display, Out-Cell OLED touch display, On-Cell OLED touch display and In-Cell OLED touch display.

The crystal layer preferably includes one birefringent crystal possessing a birefringence that is calculated from the formula $\Delta n = n_e - n_o \neq 0$ for serving as a transparent window. The birefringent crystal is preferably selected from a group consisting of a sapphire or quartz. The crystal layer has a thickness greater than 100 times of a wavelength of the incident light. The sapphire preferably consists of crystals having one of C-axis, M-axis, A-axis and R-axis. The quartz consists of crystals utilizing a C-axis plane with chiral characteristics for reflecting and emitting the reflection light in left hand or right hand structure.

The crystal layer includes at least one linear polarizer such that an incident light after hitting a display module of the display device reflects and emits out through the linear polarizer and the crystal layer sequentially as reflection light in form of circularly polarized light or elliptically polarized light, thereby enhancing the viewable quality of the display device. Note that since the birefringent crystal of the crystal layer possesses wave phase delay characteristics for causing wave phase delay during reflection of the reflection light from the polarizing layer, the quarter-wave plate is replaced by the crystal layer. In other words, no quarter-wave plate is installed between the crystal layer and the linear polarizer.

In one embodiment, in order to reduce the amount of reflective light from the touch screen display, a circular polarized plate serves as the polarizing layer, wherein the polarizing layer further includes a quarter-wave plate in addition to the linear polarizer so that the linear polarizer is sandwiched between the crystal layer and the quarter-wave plate such that the incident light after hitting a reflection interface in the display module reflects as the reflection light passing through the quarter-wave plate, the linear polarizer sequentially, and converts into the circularly polarized light and elliptically polarized light. Since the reflection direction of the two polarized light is opposite to the hitting direction of the incident light owing to the reflection interface, the reflection light refracts with respect to the linear polarizer after passing through the wave phase delay plate. In case the polarization direction is perpendicular with the linear polarizer, the polarized light cannot pass through the linear polarizer, thereby reducing the amount of the reflection light and hence possessing anti-reflection property.

In accordance with the present invention, a display device and/or touch screen display is provided firstly, which includes a display and/or touch module. According to another step, a polarization conversion mechanism consisting of a crystal layer and a polarizing layer is disposed on the display and/or touch module.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
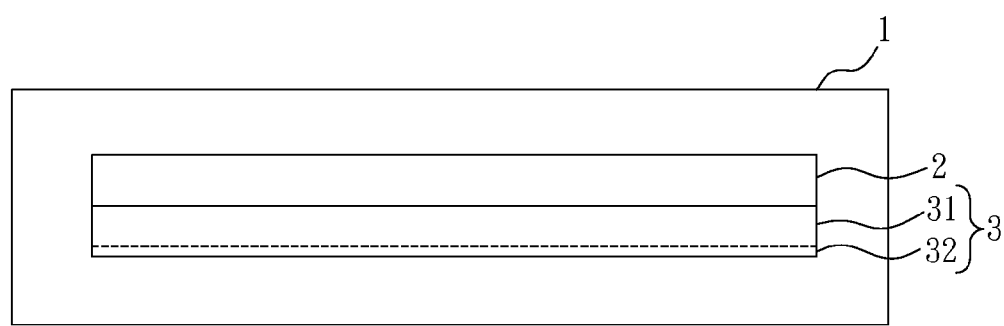
FIG. 1 is a schematic view illustrating a polarization conversion mechanism of the present invention.

FIG. 1 is a schematic view illustrating a polarization conversion mechanism 1 of the present invention for implementing in a display device and/or touch screen display, wherein the touch screen display is selected from a group consisting of an (Out-Cell) LCD touch display, (In-Cell) LCD touch display, (On-Cell) LCD touch display, (In-Cell/On-Cell) hybrid LCD touch display, (Out-Cell) OLED touch display, (On-Cell) OLED touch display and (In-Cell) OLED touch display. The polarization conversion mechanism 1 of the present invention includes a crystal layer 2 and a polarizing layer 3.

The crystal layer 2 utilizes a birefringent crystal for changing the phase delay effect in accordance with the orientation of the crystal axis thereof. Since the crystal layer 2 possesses wave phase delay characteristics for causing wave phase delay during reflection of the reflection light from the polarizing layer, the quarter-wave plate is replaced by the crystal layer 2, thereby increasing the rigidity thereof and anti-wear resistance of the touch screen display. The polarized light of the incident light is converted into and emits out as the circularly polarized light and elliptic polarized light due to the specific characteristic of the crystal layer 2.

The polarizing layer 3 includes at least one linear polarizer 31 such that an incident light after hitting a display module of the display device reflects and emits out through the linear polarizer 31 and the crystal layer 3 sequentially as reflection light in form of circularly polarized light or elliptically polarized light, thereby enhancing the viewable quality of the display device. Note that since the birefringent crystal of the crystal layer 2 possesses wave phase delay characteristics for causing wave phase delay during reflection of the reflection light from the polarizing layer, the quarter-wave plate is replaced by the crystal layer 2. In other words, no quarter-wave plate is installed between the crystal layer 2 and the linear polarizer 31. During the installation process, an assembly of the crystal layer and said polarizing layer are installed to the display device and/or touch screen display in such a manner that the assembly is located on the display module thereof.

In one embodiment, in order to reduce the amount of reflective light from the touch screen display, a circular polarizer serves as the polarizing layer, wherein the polarizing layer further includes a quarter-wave plate 32 in addition to the linear polarizer 31 so that the linear polarizer 31 is sandwiched between the crystal layer 2 and the quarter-wave plate 32 such that the incident light after hitting a reflection interface in the display module reflects as the reflection light passing through the quarter-wave plate 32, the linear polarizer 31 sequentially, and converts into the circularly polarized light and elliptically polarized light. Since the reflection direction of the two polarized light is opposite to the hitting direction of the incident light owing to the reflection interface, the reflection light refracts with respect to the linear polarizer after passing through the wave phase delay plate. In case the polarization direction is perpendicular with the linear polarizer, the polarized light cannot pass through the linear polarizer 31, thereby reducing the amount of the reflection light and hence possessing anti-reflection property.

In other words, the incident light complementing with the quarter-wave plate 32 installed on one side of the linear polarizer 31 after passing sequentially through the linear polarizer 31 and the quarter-wave plate 32 converts into the circularly polarized light and elliptically polarized light. Since the polarization direction of the circularly polarized light and elliptically polarized light reflecting from the hitting interface is opposite to that of the incident light, the reflection light refracts and emits perpendicularly with respect to the linear polarizer 31 after passing through the quarter-wave plate 32. As a result, the polarized light cannot pass through the linear polarizer 31, thereby reducing the amount of the reflection light and hence possessing anti-reflection property and increasing the viewing ability of the touch display under the strong environment light.

Herein, the crystal layer 2 includes the birefringent crystal possessing a birefringence that is calculated from the formula $\Delta n = n_e - n_o \neq 0$ for serving as a transparent window. The birefringent crystal is preferably selected from a group consisting of a sapphire or quartz. The crystal layer has a thickness greater than 100 times of a wavelength of the incident light. The sapphire preferably consists of crystals having one of C-axis, M-axis, A-axis and R-axis. The quartz consists of crystals utilizing a C-axis plane for reflecting and emitting the reflection light in left hand or right hand structure. The polarizing layer 3 includes polarizer of simple structure so as to reduce the manufacturing expense and the polarizer is attached either on the exterior or the interior of the touch screen to have anti-wear resistance.

Figure 2:
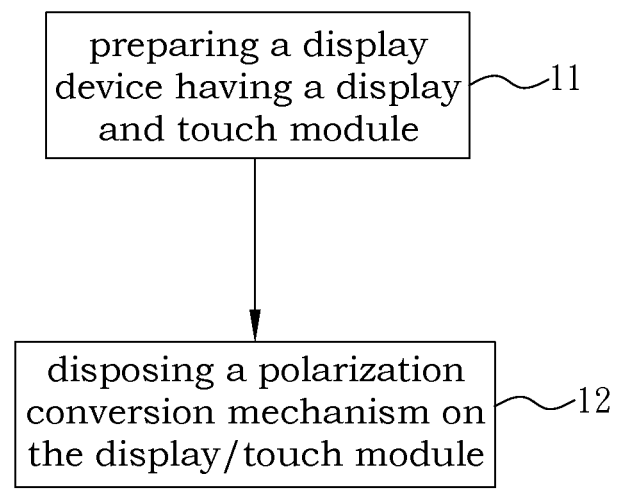
FIG. 2 is a block diagram illustrating the steps constituting the polarization conversion method of the present invention.

FIG. 2 is a block diagram illustrating the steps constituting the polarization conversion method of the present invention. As illustrated, in the step 11, a display device and/or touch screen display is provided, which includes a display and/or touch module.

According to the step 12, a polarization conversion mechanism consisting of a crystal layer and a polarizing layer is disposed on the display and/or touch module.

Figure 3:
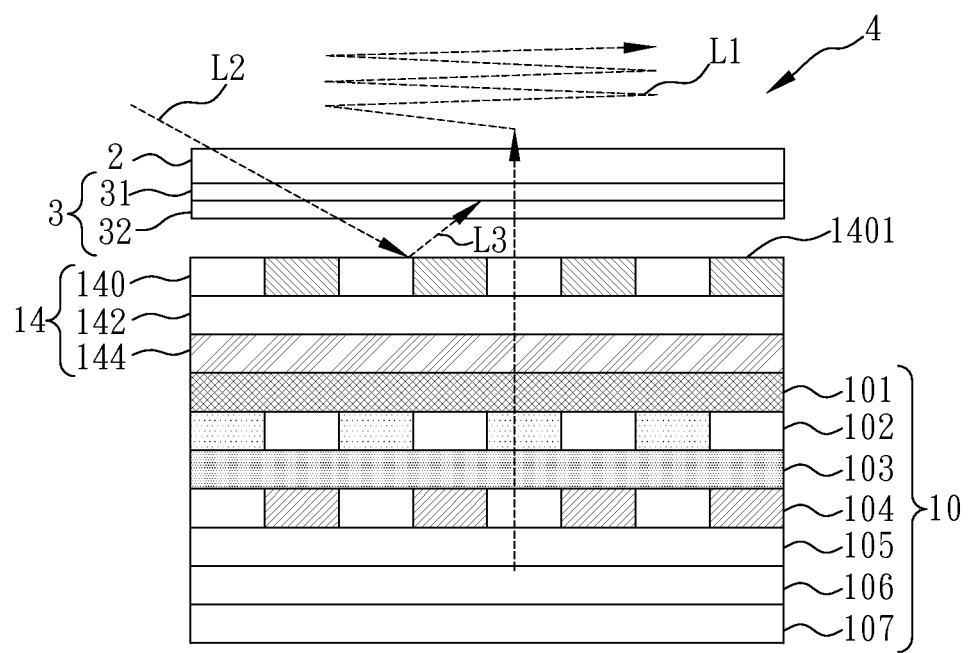
FIG. 3 is a schematic view illustrating the first embodiment of the polarization conversion mechanism of the present invention.

FIG. 3 is a schematic view illustrating the first embodiment of the polarization conversion mechanism of the present invention. As illustrated, the polarization conversion mechanism 1 of the present invention is implemented in a display device and/or touch screen display, and includes a crystal layer 2 and a polarizing layer 3. The touch screen display 4 herein is an (On-Cell) LCD touch display.

The touch display 4 includes an LCD display module 10, a touch module 14 disposed on the LCD display module 10 and the polarization conversion mechanism 1. The LCD display module 10 includes from top to bottom a color filtration glass 101, a color filtration plate 102, a liquid crystal layer 103, a thin-film transistor circuit 104, a glass substrate 105, a linear polarizer 106 and a back light source 107. The touch module 14 includes from top to bottom a Y-transparent conductive film (ITO) 140, an insulated layer 142, and an X-transparent conductive film (ITO) 144. The polarization conversion mechanism 1 is disposed above the touch module 14, and includes a crystal layer 2 and a polarizing layer 3. Herein, in order to reduce the reflective light reflected from the incident light L2, the circular polarizer serves as the crystal layer 3, which in addition to the linear polarizer 31 includes a quarter-wave plate 32.

The reflective light L1 emitting out from the touch screen display 4 passes from bottom to top through the linear polarizer 31 and the quarter-wave plate 32, converts into the circularly polarized light and/or elliptically polarized light, thereby increasing the visibility of the reflective light L1. Herein, the crystal layer 2 includes the birefringent crystal possessing a specific crystal orientation for changing phase delay effect in accordance with the orientation of the crystal axis thereof. Hence, the quarter-wave plate 32 is replaced by the crystal layer 2. In other words, no quarter-wave plate is installed between the crystal layer 2 and the linear polarizer 31.

The polarizing layer 3 further includes a quarter-wave plate 32 in addition to the linear polarizer 31 so that the linear polarizer 31 is sandwiched between the crystal layer 2 and the quarter-wave plate 32 such that the incident light L2 after hitting a reflection interface in the display module reflects as the reflection light passing through the linear polarizer 31 and the quarter-wave plate 32 converts into the circularly polarized light and/or elliptically polarized light, which is reflected from the reflection interface 1401 of the Y-transparent conductive film (ITO) 140, and the reflective light L3 firstly passes through the quarter-wave plate 32 refracts with respect to the linear polarizer 31. Since the polarization direction of the reflective light L3 is perpendicular with the linear polarizer, the polarized light cannot pass through the linear polarizer, thereby reducing the amount of the reflection light and enhancing the viewable ability of the touch screen display under the strong environment light.

In other words, the incident light L2 complementing with the quarter-wave plate 32 installed on one side of the linear polarizer 31 after passing sequentially through the linear polarizer 31 and the quarter-wave plate 32 converts into the circularly polarized light and elliptically polarized light. Since the polarization direction of the circularly polarized light and elliptically polarized light reflecting from the hitting interface 1401 is opposite to that of the incident light L2, the reflection light L3 refracts and emits perpendicularly with respect to the linear polarizer 31 after passing through the quarter-wave plate 32. As a result, the polarized light cannot pass through the linear polarizer 31, thereby reducing the amount of the reflection light and reflection interference, and hence increasing the viewing ability of the touch display under the strong environment light is increased.

Herein, the crystal layer 2 includes the birefringent crystal possessing a birefringence that is calculated from the formula $\Delta n=n_e-n_o\neq 0$ for serving as the transparent window. The birefringent crystal is preferably selected from a group consisting of a sapphire or quartz. The crystal layer has a thickness greater than 100 times of a wavelength of the incident light. The sapphire preferably consists of crystals having one of C-axis, M-axis, A-axis and R-axis. The quartz consists of crystals utilizing a C-axis plane for reflecting and emitting the reflection light in left hand or right hand structure. The polarizing layer 3 includes polarizer with simple structure so as to reduce the manufacturing expense and the polarizer is attached either on the exterior or the interior of the touch screen to have anti-wear resistance.

Figure 4:
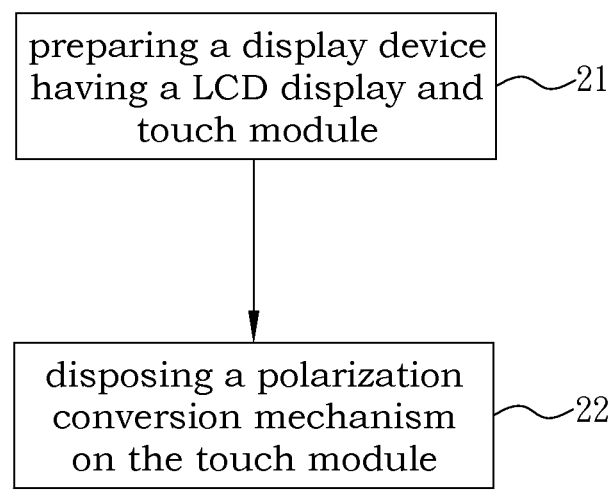
FIG. 4 is a block diagram illustrating the steps constituting the first embodiment of the polarization conversion method of the present invention.

FIG. 4 is a block diagram illustrating the steps constituting the first embodiment of the polarization conversion method of the present invention. As illustrated, in the step 21, a touch screen display 4 is provided, which includes an LCD display module 10 and a touch module 14, wherein the touch module 14 is disposed above the display module 10.

According to the step 42, a polarization conversion mechanism 1 consisting of a crystal layer 2 and a polarizing layer 3 is disposed on the touch module 14.

Figure 5:
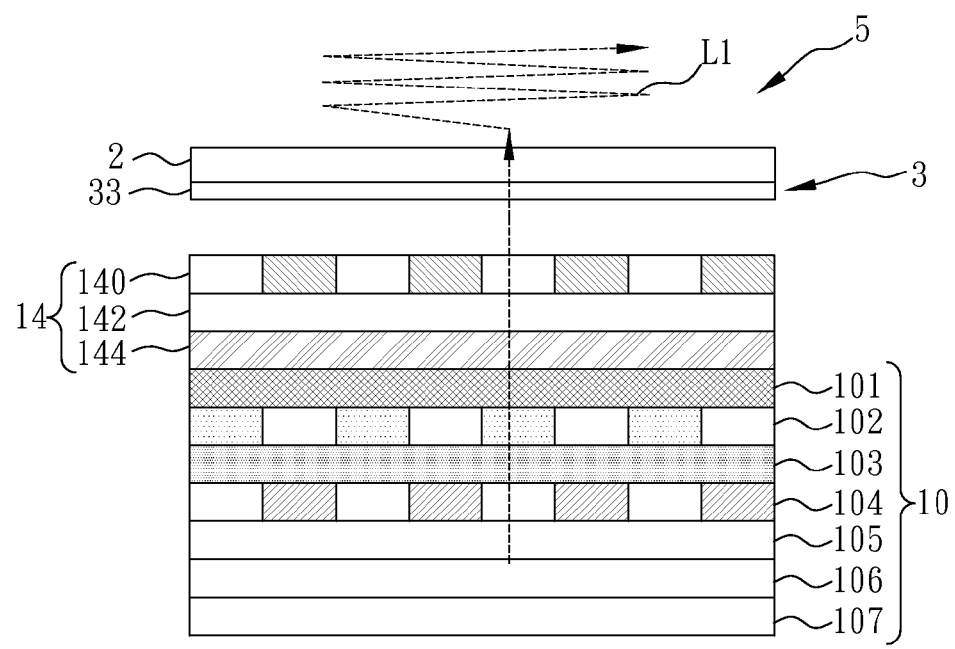
FIG. 5 is a schematic view illustrating the second embodiment of the polarization conversion mechanism of the present invention.

FIG. 5 is a schematic view illustrating the second embodiment of the polarization conversion mechanism of the present invention. As illustrated, the polarization conversion mechanism 1 of the present invention includes a crystal layer 2 and a polarizing layer 3, wherein the polarization conversion mechanism 1 is implemented in a touch screen display 5, such as an (On-Cell) LCD touch display.

The touch screen display 5 includes an LCD display module 10, a touch module 14 disposed on the LCD display module 10 and the polarization conversion mechanism 1. The LCD display module 10 includes from top to bottom a color filtration glass 101, a color filtration plate 102, a liquid crystal layer 103, a thin-film transistor circuit 104, a glass substrate 105, a linear polarizer 106 and a back light source 107. The touch module 14 includes from top to bottom a Y-transparent conductive film (ITO) 140, an insulated layer 142, and an X-transparent conductive film (ITO) 144. The polarization conversion mechanism 1 is disposed above the touch module 14, and includes a crystal layer 2 and a polarizing layer 3.

The reflective light L1 of the touch screen display 5 passes from bottom to top through the linear polarizer 33, the crystal layer 2 and converts into the circularly polarized light and/or elliptically polarized light, thereby enhancing the viewable quality of the touch screen display device. In this embodiment, since the birefringent crystal possesses wave phase delay characteristics for causing wave phase delay during reflection, the quarter-wave plate is replaced by the crystal layer 2. In other words, no quarter-wave plate is installed between the crystal layer 2 and the linear polarizer 33.

The crystal layer 2 utilizes a birefringent crystal for changing the phase delay effect in accordance with the orientation of the crystal axis thereof. Since the birefringent crystal possesses wave phase delay characteristics for causing wave phase delay during reflection through the linear polarizer 33, the quarter-wave plate is replaced by the crystal layer 2 so that the reflective light passing through the birefringent crystal is delayed at the quarter-wave phase, thereby emitting the reflective light L1 in form of the circularly polarized light and/or elliptically polarized light.

In this embodiment, the crystal layer 2 applies the birefringent crystal possessing a birefringence that is calculated from the formula $\Delta n=n_e-n_o\neq 0$ for serving as the transparent window. The crystal layer has a thickness greater than 100 times of a wavelength of the incident light. The birefringent crystal is preferably selected from a group consisting of a sapphire or quartz. The sapphire preferably consists of crystals having one of C-axis, M-axis, A-axis and R-axis. The quartz consists of crystals utilizing a C-axis plane for reflecting and emitting the reflection light in left hand or right hand structure. The polarizing layer 3 includes polarizer plate with simple structure so as to reduce the manufacturing expense and the polarizer plate is attached either on the exterior or the interior of the touch screen to have anti-wear resistance.

Figure 6:
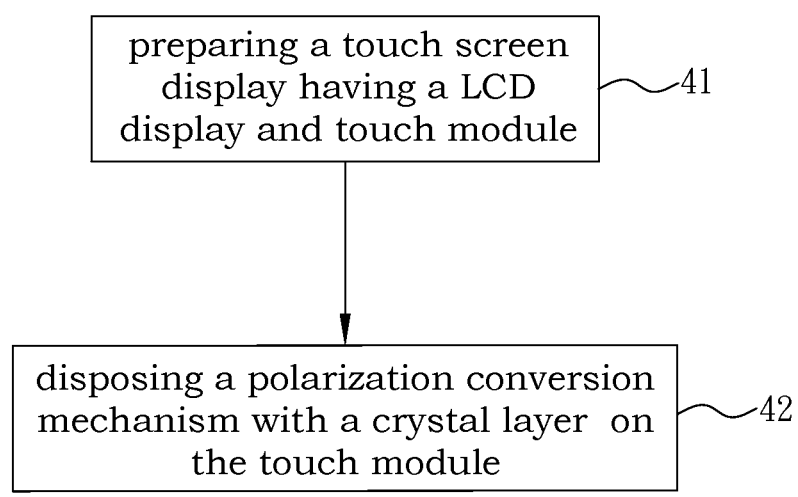
FIG. 6 is a block diagram illustrating the steps constituting the second embodiment of the polarization conversion method of the present invention.

FIG. 6 is a block diagram illustrating the steps constituting the second embodiment of the polarization conversion method of the present invention shown in FIG. 5. As illustrated, in the step 41, a touch screen display 5 is provided, which includes an LCD display module 10 and a touch module 14, wherein the touch module 14 is disposed above the display module 10.

According to the step 42, a polarization conversion mechanism 1 consisting of a crystal layer 2 and a polarizing layer 3 is disposed on the touch module 14.

Figure 7:
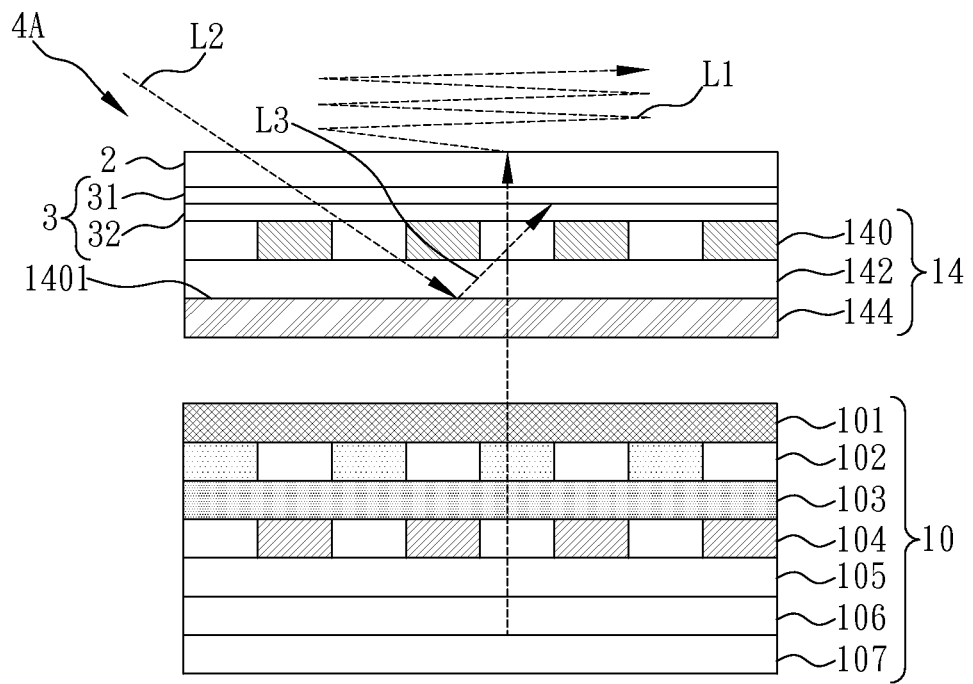
FIGS. 7-9 illustrate how the polarization conversion mechanism of the present invention is implemented in a touch screen display.
Figure 8:
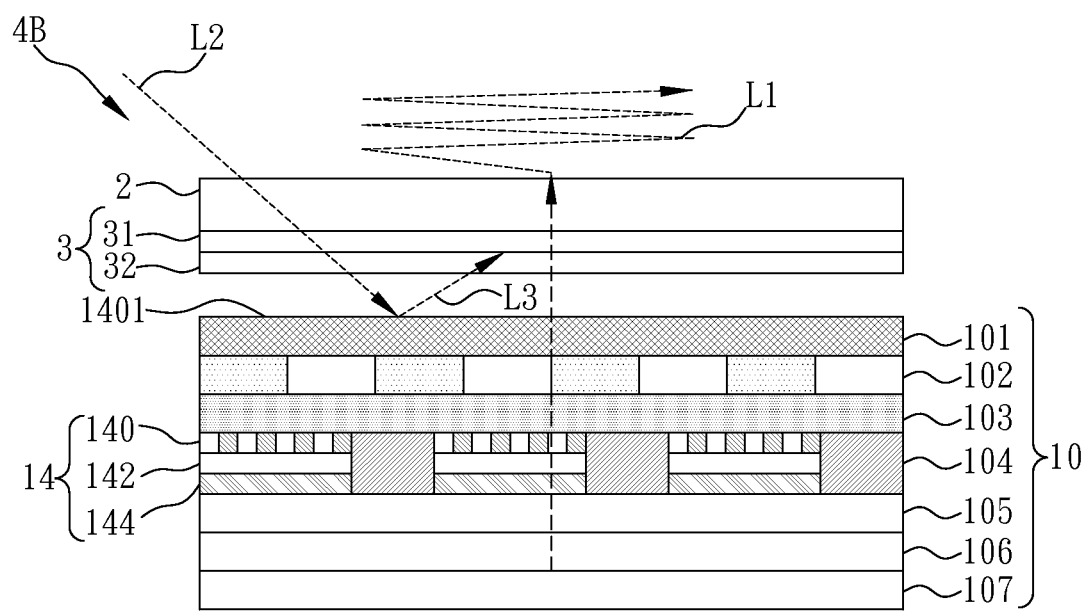
Figure 9:
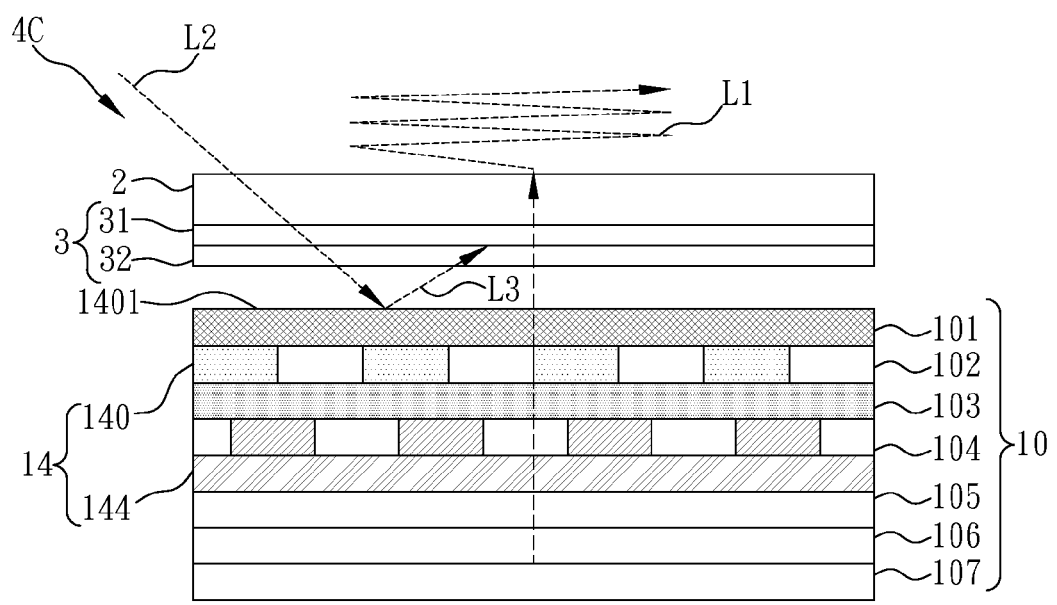

The touch screen display shown in FIGS. 3 and 5 is an (On-Cell) LCD touch display. Similar principle is applied for other LCD touch display. Referring to FIGS. 7-9, wherein the touch screen display 4A, 4B and 4C respectively are an (Out-Cell) LCD touch display, (In-Cell) LCD touch display, (In-Cell/On-Cell hybrid) LCD touch display. Even though installation of the touch module 14 differs from one another, the crystal layer 2 replaces the prior art glass substrate, simultaneously possesses the quarter-wave effect so as to increase the rigidity of the touch screen to have anti-wear resistance. The crystal layer 2 emits out the reflective light L1 in form of the circularly polarized light and/or elliptically polarized light, thereby reducing the reflection amount of the reflective light. Like the previous embodiment, the quarter-wave plate can be excluded. Since conversion of the reflective light in form of the circularly polarized light and/or elliptically polarized light is the same, a detailed description of the same is omitted herein.

Figure 10:
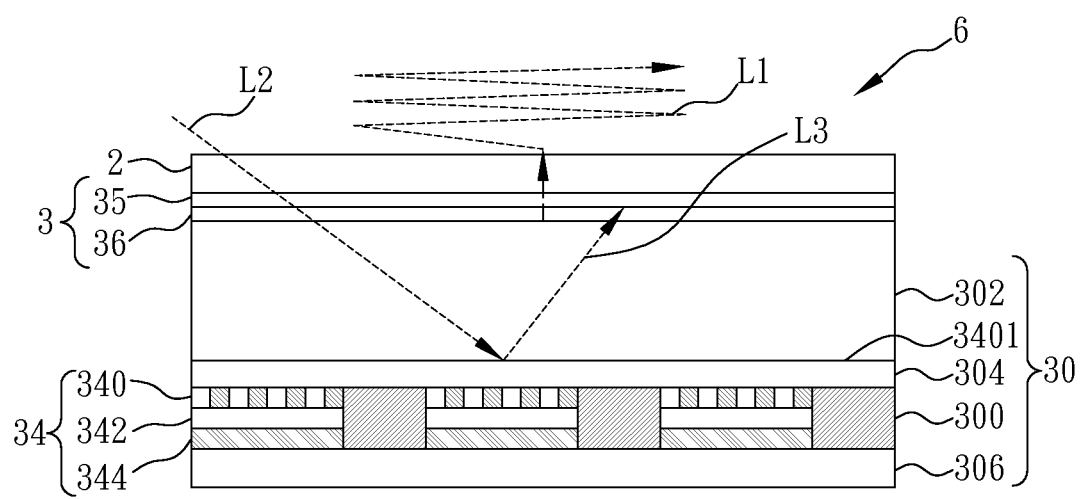
FIG. 10 is a schematic view illustrating the third embodiment of the polarization conversion mechanism of the present invention.

FIG. 10 is a schematic view illustrating the third embodiment of the polarization conversion mechanism of the present invention. As illustrated, the polarization conversion mechanism 1 of the present invention includes a crystal layer 2 and a polarizing layer 3, wherein the polarization conversion mechanism 1 is implemented in a touch screen display 6, such as an (In-Cell) (top emission) OLED touch display.

The touch screen display 6 includes a (top emission) OLED display module 30, a touch module 34 and the polarization conversion mechanism 1. The OLED display module 30 includes from top to bottom a thin-film transistor circuit 300, a color filtration glass 101, an OLED layer 302, a reflective layer 304 and a bottom substrate 306. The touch module 34 is disposed on the OLED display module 30, and includes from top to bottom a Y-transparent conductive film (ITO) 340, an insulated layer 342 and an X-transparent conductive film (ITO) 344. The polarization conversion mechanism 1 is disposed above the touch module 34, and includes a crystal layer 2 and a polarizing layer 3. In order to reduce the reflection of the incident light L2, a circular polarizer serves as the polarizing layer 3, which in addition to the linear polarizer 35 includes a quarter-wave plate 36.

The reflective light L1 of the touch screen display 6 passes from bottom to top through the linear polarizer 35, the crystal layer 2 and converts into the circularly polarized light and/or elliptically polarized light, thereby enhancing the viewable quality of the touch screen display device. In this embodiment, since the birefringent crystal possesses wave phase delay characteristics for causing wave phase delay during reflection, the quarter-wave plate is replaced by the crystal layer 2. In other words, no quarter-wave plate is installed between the crystal layer 2 and the linear polarizer 35.

The crystal layer 2 utilizes a birefringent crystal for changing the phase delay effect in accordance with the orientation of the crystal axis thereof. Since the birefringent crystal possesses wave phase delay characteristics for causing wave phase delay during reflection through the linear polarizer 35, the quarter-wave plate is replaced by the crystal layer 2 so that the reflective light passing through the birefringent crystal is delayed at the quarter-wave phase, thereby emitting the reflective light L1 in form of the circularly polarized light and/or elliptically polarized light.

The polarizing layer 3 further includes a quarter-wave plate 36 in addition to the linear polarizer 35, wherein the linear polarizer 35 is sandwiched between the crystal layer 2 the quarter-wave plate 36 such that the incident light L2 reflects as the reflection light passing through the linear polarizer 35 and the quarter-wave plate 36 converts into the circularly polarized light and/or elliptically polarized light. Since the circularly polarized light and/or elliptically polarized light is reflected from the reflection interface 3401 of the Y-transparent conductive film (ITO) 340, and the reflective light L3 firstly passes, through the quarter-wave plate 36, refracts with respect to the linear polarizer 35. Since the polarization direction of the reflective light L3 is perpendicular with the linear polarizer 35, the polarized light cannot pass through the linear polarizer 35, thereby reducing the amount of the reflection light and enhancing the viewable ability of the touch screen display under the strong environment light.

In other words, the incident light L2 complementing with the quarter-wave plate 36 installed on one side of the linear polarizer 35 after passing sequentially through the linear polarizer 35 and the quarter-wave plate 36 converts into the circularly polarized light and elliptically polarized light. Since the polarization direction of the circularly polarized light and elliptically polarized light reflecting from the hitting interface 3401 is opposite to that of the incident light L2, the reflection light L3 refracts and emits perpendicularly with respect to the linear polarizer 35 after passing through the quarter-wave plate 36. As a result, the polarized light cannot pass through the linear polarizer 35, thereby reducing the amount of the reflection light from the touch screen display and increasing the viewing ability of the touch screen display under the strong environment light.

In this embodiment, the polarization conversion mechanism 1 of the present invention is implemented in a touch screen display, which is in fact an (In-Cell) top emission OLED touch display. Other touch displays, such as (Out-Cell) OLED touch display and (In-Cell) OLED touch display can also be installed with the polarization conversion mechanism 1 in the similar manner.

Figure 11:
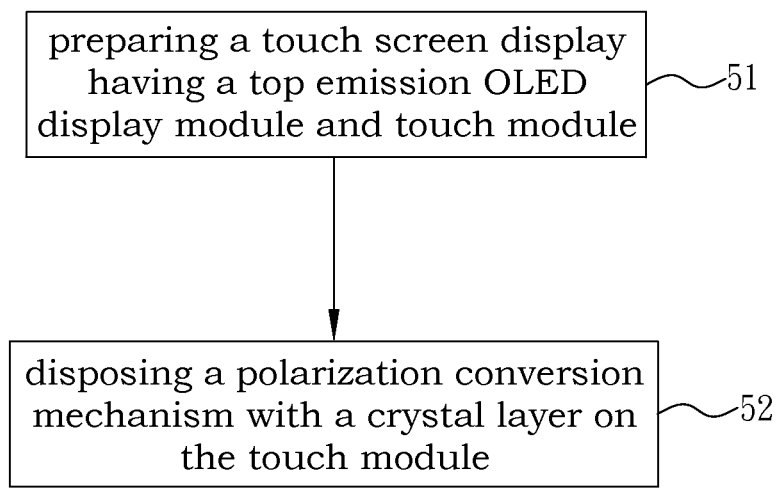
FIG. 11 is a block diagram illustrating the steps constituting the third embodiment of the polarization conversion mechanism of the present invention.

FIG. 11 is a block diagram illustrating the steps constituting the third embodiment of the polarization conversion mechanism of the present invention shown in FIG. 10. As illustrated, in the step 51, an (top emission) OLED touch display 6 is provided, which includes an OLED display module 30 and a touch module 34, wherein the touch module 34 is disposed above the OLED display module 30.

According to the step 52, a polarization conversion mechanism 1 consisting of a crystal layer 2 and a polarizing layer 3 is disposed on the touch module 34, wherein the polarizing layer 3 includes a linear polarizer 35 and a quarter-wave plate 36.

Figure 12:
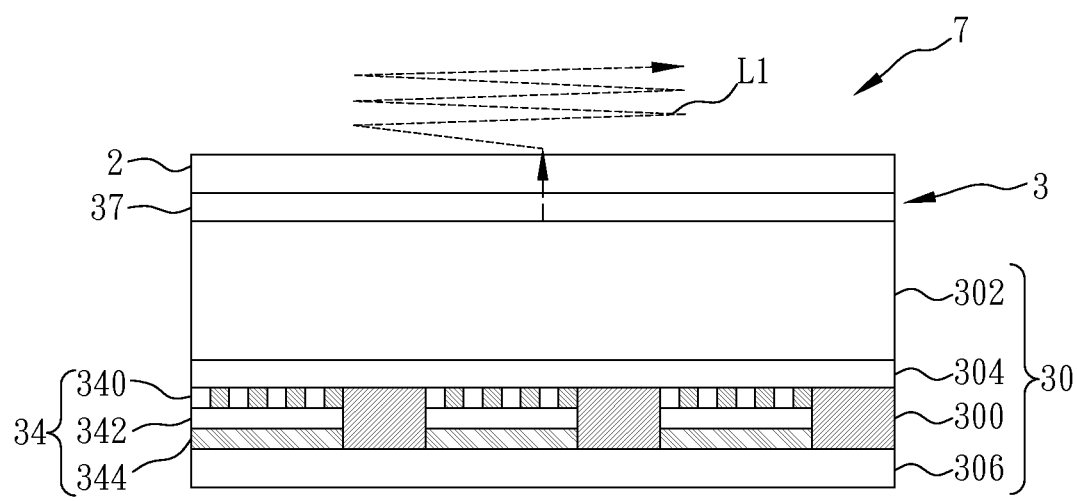
FIG. 12 is a schematic view illustrating the fourth embodiment of the polarization conversion mechanism of the present invention.

FIG. 12 is a schematic view illustrating the fourth embodiment of the polarization conversion mechanism of the present invention. As illustrated, the polarization conversion mechanism 1 of the present invention includes a crystal layer 2 and a polarizing layer 3, wherein the polarization conversion mechanism 1 is implemented in a touch screen display 7, such as an (In-Cell) OLED (top emission) touch display.

The touch display 7 includes a (top emission) OLED display module 30, a touch module 34 and the polarization conversion mechanism 1. The OLED display module 30 includes from top to bottom a thin-film transistor circuit 300, an OLED layer 302, a reflective layer 304 and a bottom substrate 306. The touch module 34 is disposed on the OLED display module 30, and includes from top to bottom a Y-transparent conductive film (ITO) 340, an insulated layer 342 and an X-transparent conductive film (ITO) 344. The polarization conversion mechanism 1 is disposed above the touch module 34, and includes a crystal layer 2 and a polarizing layer 3, wherein a linear polarizer 37 serves as the polarizing layer.

The reflective light L1 of the touch screen display 7 passes from bottom to top through the linear polarizer 37, the crystal layer 2 and converts into the circularly polarized light and/or elliptically polarized light, thereby enhancing the viewable quality of the touch screen display device. In this embodiment, the birefringent crystal possesses wave phase delay characteristics for causing wave phase delay during reflection, the quarter-wave plate is replaced by the crystal layer 2. In other words, no quarter-wave plate is installed between the crystal layer 2 and the linear polarizer 37.

The crystal layer 2 utilizes a birefringent crystal for changing the phase delay effect in accordance with the orientation of the crystal axis thereof. Since the birefringent crystal possesses wave phase delay characteristics for causing wave phase delay during reflection through the linear polarizer 37, the quarter-wave plate is replaced by the crystal layer 2 so that the reflective light passing through the crystal layer 2 is delayed at the quarter-wave phase, thereby emitting the reflective light L1 in form of the circularly polarized light and/or elliptically polarized light.

In this embodiment, the polarization conversion mechanism 1 of the present invention is implemented in a touch screen display 7, which is in fact an (In-Cell) top emission OLED touch display. Other touch displays, such as (Out-Cell) OLED touch display and (In-Cell) OLED touch display can also be installed with the polarization conversion mechanism 1 in the similar manner.

Figure 13:
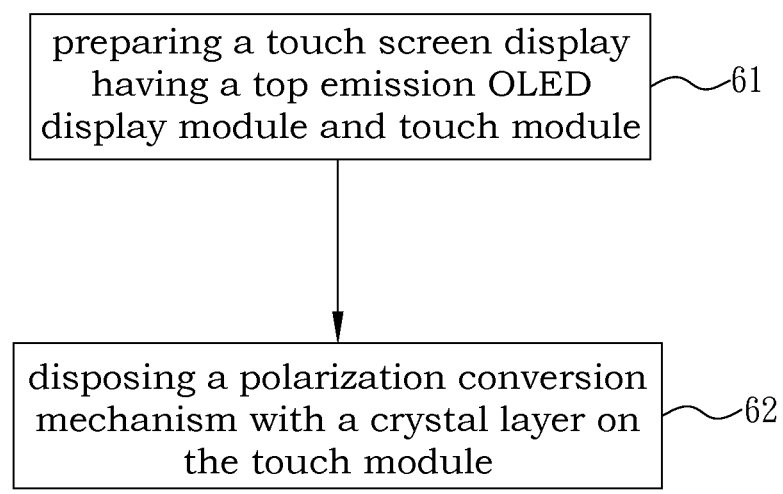
FIG. 13 is a block diagram illustrating the steps constituting the fourth embodiment of the polarization conversion method of the present invention.

FIG. 13 is a block diagram illustrating the steps constituting the fourth embodiment of the polarization conversion method of the present invention. As illustrated, in the step 61, a touch screen display 7 is provided, which includes an OLED display module 30 and a touch module 34, wherein the touch module 34 is disposed below the display module 30.

According to the step 62, a polarization conversion mechanism 1 consisting of a crystal layer 2 and a polarizing layer 3 is disposed on the touch module 14, wherein a linear polarizer 37 servers as the polarizing layer 3.

Figure 14:
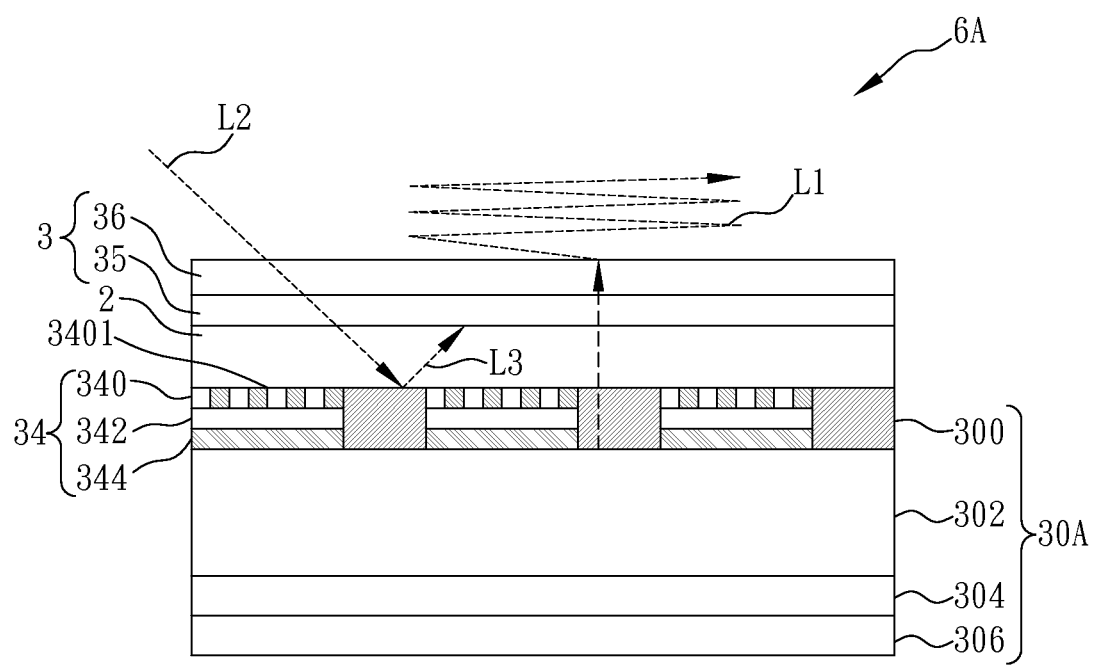
FIG. 14 illustrates how the polarization conversion mechanism of the present invention is implemented in an OLED (organic light emitting diode) touch screen display.

The touch screen display employed in FIGS. 10 and 12 is an (In-Cell) top emission OLED touch display. Similar principle is applied for other OLED touch display. Referring to FIG. 14, wherein the touch screen display 6A is an (In-Cell) back emission OLED touch display. Even though installation of the back emission OLED touch display 30A differs from one another, the crystal layer 2 replaces the prior art glass substrate, and simultaneously possesses the quarter-wave effect so as to increase the rigidity of the touch screen to have anti-wear resistance. The crystal layer 2 emits out the reflective light L1 in form of the circularly polarized light and/or elliptically polarized light, thereby reducing the reflection amount of the reflective light. Like those previous embodiments, the quarter-wave plate 36 can be excluded. Since conversion of the reflective light in form of the circularly polarized light and/or elliptically polarized light is the same, a detailed description of the same is omitted herein.

As described above, the method and polarization conversion mechanism of the present invention provides the following advantages:

1. The polarization conversion mechanism is implemented in an LCD display and/or touch screen display, in which, the crystal layer utilizes the birefringent crystal for changing phase delay effect in accordance with the orientation of the crystal axis. The birefringent crystal possesses wave phase delay characteristics for causing wave phase delay during reflection of the reflection light from the polarizing layer and the same can replace the quarter-wave plate and emits the reflection light in form of circularly polarized light or elliptically polarized light. Based on the orientation of the crystal axis of the crystal layer and the linear polarizer, the birefringent crystal serves as a transparent window for emitting the reflective light regardless of horizontal or vertical position of the display device.

2. The quarter-wave plate or film can be excluded since the crystal layer can convert the reflective light in form of circularly polarized light or elliptically polarized light. The polarizer includes polarizer with simple structure so as to reduce the manufacturing cost of the display device and/or touch screen display.

3. During emission of the reflective light from the display device, the reflective light passes through from bottom to top through the polarizing layer with polarization property, the crystal layer 2 and converts into the circularly polarized light and/or elliptically polarized light. Since the crystal layer possesses wave phase delay characteristics for causing wave phase delay during reflection, the number of films employed therein can be reduced, thereby reducing the overall thickness of the touch screen display device.

While the invention has been described in connection with what is considered the most practical and preferred embodiments, it is understood that this invention is not limited to the disclosed embodiments but is intended to cover various arrangement included within the spirit and scope of the broadest interpretation so as to encompass all such modifications and equivalent arrangements.

What is claimed is:

1. A polarization conversion mechanism for a display module, comprising:
   a crystal layer consisting of a solid birefringent crystal with a crystal axis oriented to incur a phase delay to an incident light, said crystal layer also serving as an anti-wear resistance layer for the display module; and
   a polarizing layer, disposed immediately adjacent to said crystal layer, including at least one linear polarizer;
   wherein the polarization conversion mechanism is installed on the display module with said crystal layer being an outer most layer and said polarizing layer disposed between said crystal layer and the display module so that the incident light passing through said crystal layer and said polarizing layer is reflected from the display module to form a reflect light returned through said polarizing layer and said crystal layer sequentially to become a circularly or elliptically polarized light.

2. The polarization conversion mechanism according to claim 1, wherein said polarizing layer further includes a quarter-wave plate, said linear polarizer being sandwiched between said crystal layer and said quarter-wave plate.

3. The polarization conversion mechanism according to claim 1, wherein the display module is used in a touch screen display selected from a group consisting of Out-Cell LCD touch display, In-Cell LCD touch display, On-Cell LCD touch display, In-Cell/On-Cell hybrid LCD touch display, Out-Cell OLED touch display, On-Cell OLED touch display and In-Cell OLED touch display.

4. The polarization conversion mechanism according to claim 1, wherein said birefringent crystal possesses a birefringence calculated from the formula $\Delta n = n_e - n_o \neq 0$ and serves as a transparent window, $n_e$ and $n_o$ being optical index and refractive index respectively of said birefringent crystal, said crystal layer having a thickness greater than 100 times of a wavelength of the incident light.

5. The polarization conversion mechanism according to claim 4, wherein said birefringent crystal is selected from a group consisting of a sapphire and quartz, wherein said sapphire consists of crystals having one of C-axis, M-axis, A-axis and R-axis, and said quartz consists of crystals utilizing a C-axis plane for reflecting and emitting said reflection light in left hand or right hand structure.

6. A polarization conversion method for a display module, comprising the steps of:

providing a display module; and disposing a polarization conversion mechanism on the display module, said polarization conversion mechanism including a crystal layer and a polarizing layer disposed immediately adjacent to said crystal layer, wherein said crystal layer consists of a solid birefringent crystal with a crystal axis oriented to incur a phase delay to an incident light, said crystal layer also serving as an anti-wear resistance layer for the display module, and said polarizing layer includes at least one linear polarizer;

wherein said crystal layer is installed as an outer most layer with said polarizing layer disposed between said crystal layer and the display module so that the incident light passing through said crystal layer and said polarizing layer is reflected from the display module to form a reflect light returned through said polarizing layer and said crystal layer sequentially to become a circularly or elliptically polarized light.

7. The polarization conversion method according to claim 6, wherein the display module is used in a display device or a touch screen display.

8. The polarization conversion method according to claim 7, wherein said polarizing layer further includes a quarter-wave plate, said linear polarizer being sandwiched between said crystal layer and said quarter-wave plate.

9. The polarization conversion method according to claim 7, wherein the touch screen display is selected from a group consisting of Out-Cell LCD touch display, In-Cell LCD touch display, On-Cell LCD touch display, In-Cell/On-Cell hybrid LCD touch display, Out-Cell OLED touch display, On-Cell OLED touch display and In-Cell OLED touch display.

10. The polarization conversion method according to claim 6, wherein said birefringent crystal possesses a birefringence calculated from the formula $\Delta n = n_e - n_o \neq 0$ and serves as a transparent window, $n_e$ and $n_o$ being optical index and refractive index respectively of said birefringent crystal, said crystal layer having a thickness greater than 100 times of a wavelength of the incident light.

11. The polarization conversion method according to claim 10, wherein said birefringent crystal is selected from a group consisting of a sapphire and quartz, wherein said sapphire consists of crystals having one of C-axis, M-axis, A-axis and R-axis, and said quartz consists of crystals utilizing a C-axis plane for emitting said reflection light in left hand or right hand structure.

* * * * *